Nov. 25, 1969  B. N. NAYDAN  3,480,947
SOLID STATE DIGITAL CONTROL TRANSFORMER
Filed Sept. 1, 1966  3 Sheets-Sheet 2

*INVENTOR.*
BOB N. NAYDAN
BY
Karl A. Ohralik
ATTORNEY

INVENTOR.
BOB N. NAYDAN
BY Karl A. Ohralik
ATTORNEY

United States Patent Office 3,480,947
Patented Nov. 25, 1969

3,480,947
SOLID STATE DIGITAL CONTROL TRANSFORMER
Bob N. Naydan, Oakland, N.J., assignor to Singer-General Precision System Inc., Little Falls, N.Y., a corporation of Delaware
Filed Sept. 1, 1966, Ser. No. 576,747
Int. Cl. H04l 3/00; G08c 9/00
U.S. Cl. 340—347                    6 Claims

ABSTRACT OF THE DISCLOSURE

A control transmitter which receives both an analog signal representing servo position and digital input command signals produces analog error signals for controlling the servo. Each embodiment includes a resistance network arrangement to which the servo position signals are applied under control of a switching network responsive to the digital command signals. The resistance network arrangement may take the form of sine and cosine networks or a linear network, depending on the form of the information in the digital command signals. For example, the digital command information may be in the form of the command angle or a trigonometric function of the command angle. In each case a summing amplifier receives the output of the resistance network arrangement. In one case, it receives also signals from the servo but in each case, the summing amplifier produces an output which is a trigonometric function of the difference in the servo position and the command. Such an output is applied to the servo motor for reducing the error to zero.

---

Figure 1:
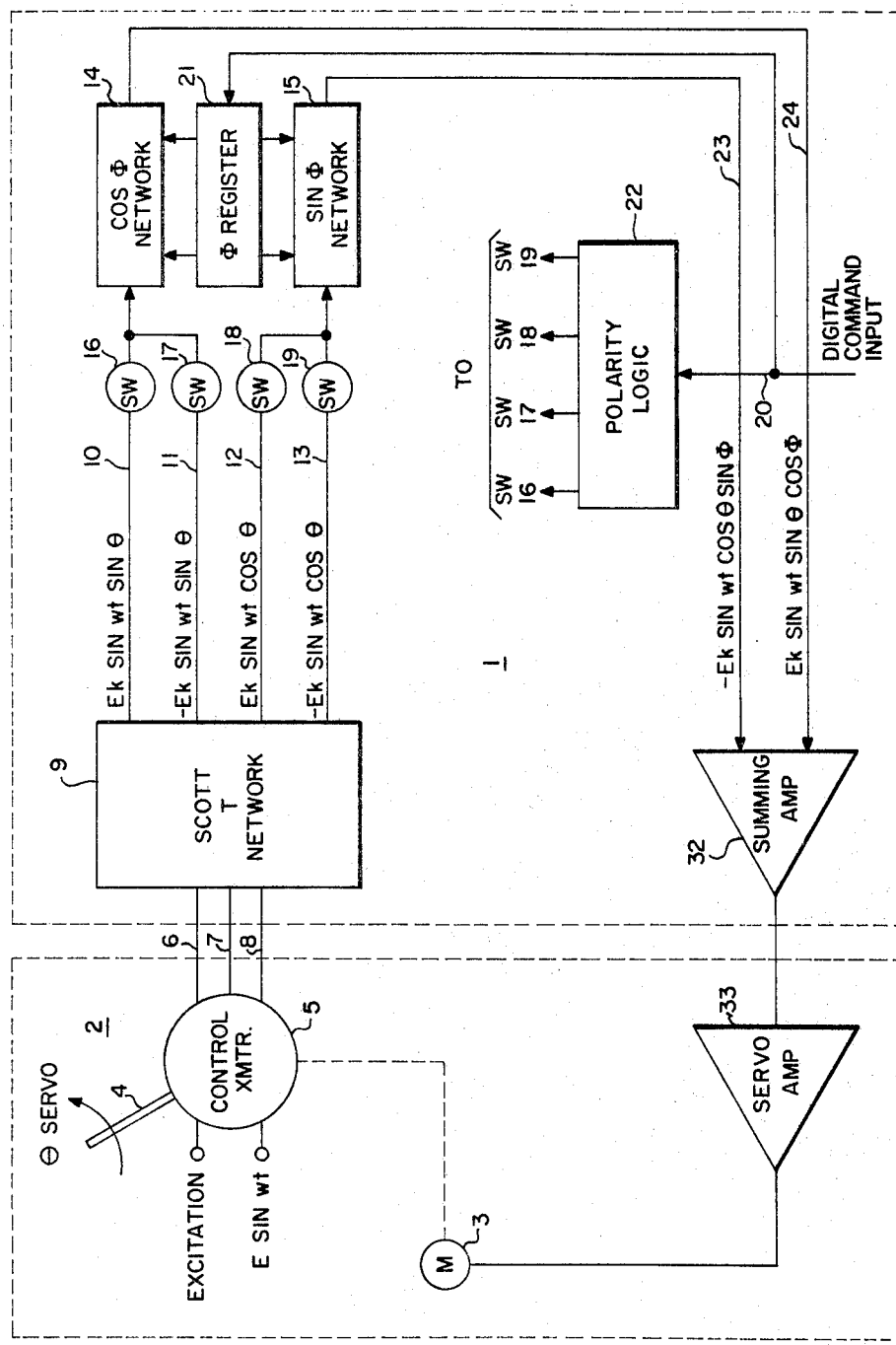

In accordance with the notice in 859 O.G. 346, certain essential portions of the present disclosure are hereby incorporated herein by reference to U.S. Patent No. 3,277,464, entitled "Digital to Synchro Converter" by Naydan et al., issued on Oct. 4, 1966 and assigned to the assignee of the present invention.

This invention relates to servo systems and more particularly to solid state digital control transformers which are responsive to both a servo signal in analog form and a command signal in digital form to compare these signals and produce an analog difference signal for effecting a change of servo position.

Systems, which develop error signals by comparison of a digital input command with an analog signal representing physical position of a servo element are known. In a typical such system, the position of a servo motor rotor, for example, is digitally represented by signals derived from a code wheel connected so as to be rotated by the motor. The input command signals and signals derived from the code wheel, both of which are in digital form, are compared in a digital comparator to produce a digital error signal. By means of a digital to analog converter, an analog error signal suitable for application to a servo amplifier and servo motor is produced from the digital error signal, and correction of motor position to zero error is effected.

While such prior systems have met with considerable success, the demands of modern technology require systems which are of greater reliability and accuracy, lower cost, reduced size and weight and quicker in response. Certain mechanical components of such prior systems possess inherent disadvantages in these respects.

Accordingly, it is a principal object of this invention to facilitate the production of analog error signals for a servo by solid state, non-moving circuit elements responsive to both an analog position signal from the servo and a digital command signal.

It is another object of this invention to provide analog error signals for use in a servo system by means which are light and small, utilize low power and are of greater reliability than previous apparatus performing the same type of functions.

Pursuant to these objects and in accordance with this invention, analog error signals proportional to a trigonometric function of angular displacement or error in servo position are generated by transforming servo position signals which are in three position-phase to two position-phase signals representing sine and cosine of servo angular position and combining such two phase signals with a trigonometric, analog equivalent of a digital input command signal. By a judicious combination of such signals, an analog error signal equal to a trigonometric function of the difference in servo angular position and command position is produced, and is useful for controlling the movement and position of the servo. This is accomplished by reducing the analog error signal to zero.

The input command signals may be in the form of an angle digitally represented or in the form of some trigonometric function of the angle as, for example, the tangent of the angle digitally represented. In either case, an appropriate network as of the ladder type may be utilized for modifying the two phase signals, such as the sine and cosine so as to produce a pair of signals, each reflecting information concerning the position of the servo and the digitally introduced information. Such composite signals are combined in a summing amplifier and an analog error or correction signal is produced which is a function of the difference in servo angular position and command position. This is applied to the servo amplifier for energizing the servo motor and, thus, driving the servo transmitter to a position for reducing the servo displacement to zero.

Figure 2:
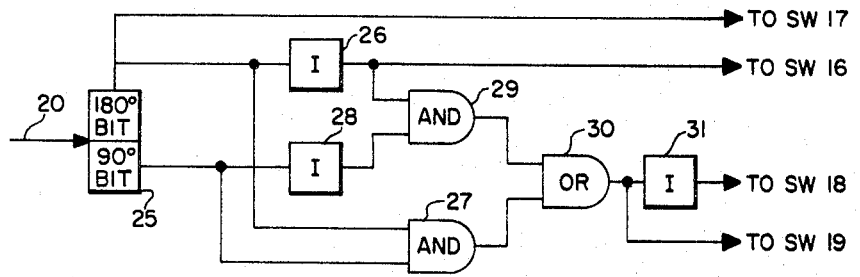
Figure 3:
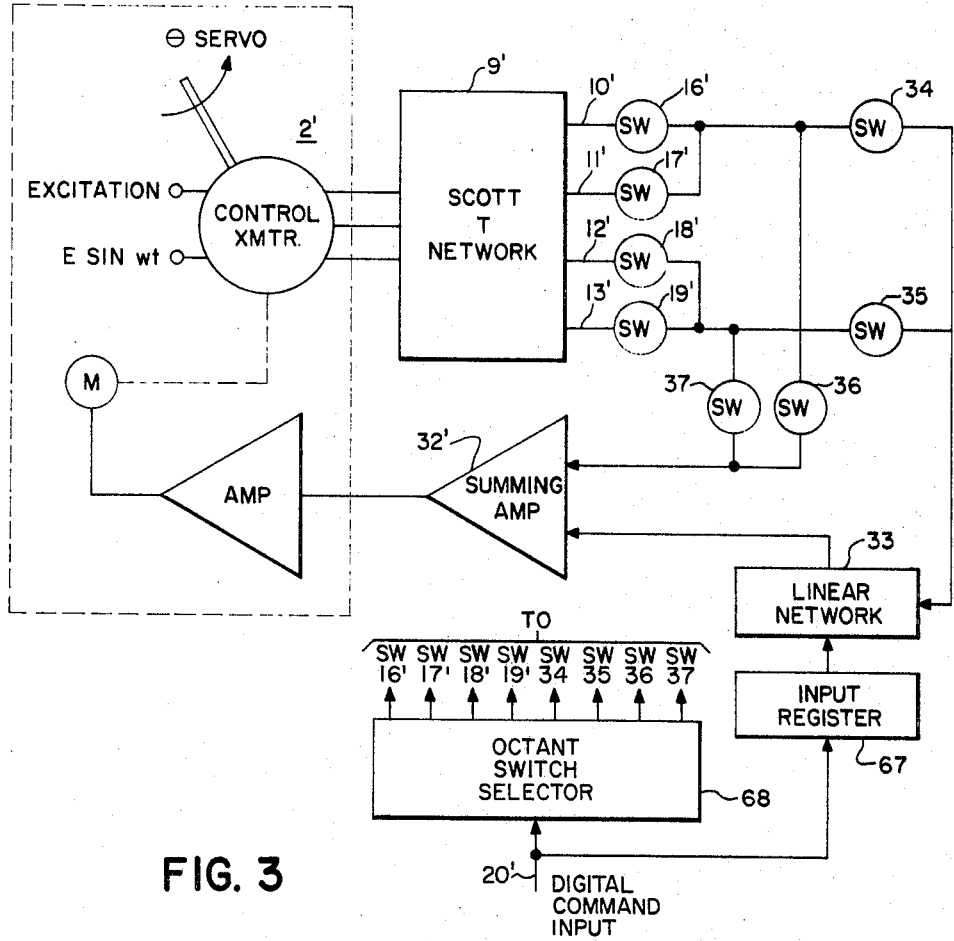
Figure 4:
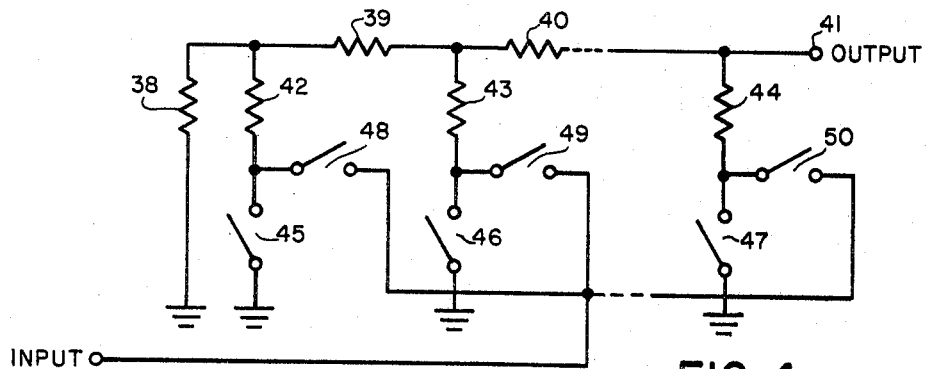
Figure 5:
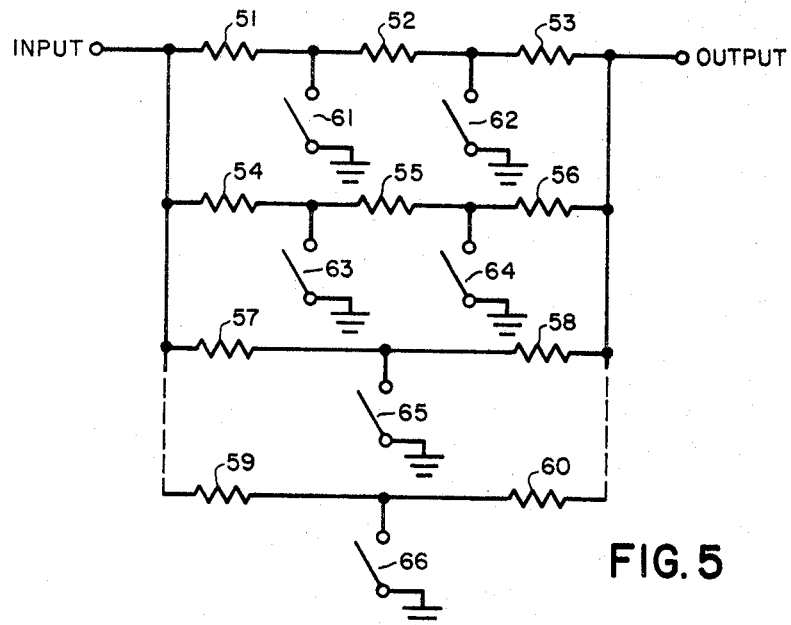
Figure 6:
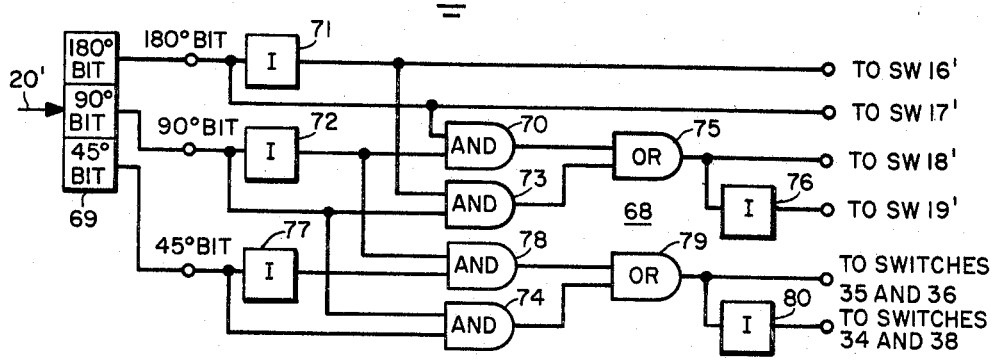

Other and further objects and advantages of the invention will be apparent from the following detailed description thereof taken together with the accompanying drawings in which:

FIGURE 1 is a block diagram schematically representing the inter-relationship of components forming one embodiment of a digital control transformer of this invention as utilized in a servo system, FIGURE 2 is a block diagram of a polarity logic circuit forming a component of the circuit of FIGURE 1, FIGURE 3 is a block diagram schematically representing the inter-relationship of components of an alternative embodiment of control transformer of the present invention, FIGURES 4 and 5 are alternative embodiments of ladder networks utilizable in the control transformer shown in FIGURE 3, and FIGURE 6 is a block diagram of an octant switch selector circuit utilizable in the control transformer shown in FIGURE 3.

Referring now to FIGURE 1 of the drawings for a detailed description of the invention, 1 represents generally the control transformer of this invention for controlling the operation of a servo system shown generally at 2. Characteristic of servo systems, the system 2 includes a motor 3 operable to drive a shaft 4 in either a forward or a reverse direction and the displacement of the shaft is represented by the arrow designated at $\theta$. Rotatable with the shaft 4 is a rotor, not shown, of the control transmitter 5. The control transmitter 5 also includes a stator, not shown, with a set of three stator windings spatially disposed 120° apart. The rotor of the control transmitter 5 includes a single winding which is rotatable with respect to the stator windings and is energizable by an alternating current so as to induce potentials in the three stator windings in three position-phase with respect to each other, in a well-known manner.

In performing a function contemplated by this invention, the rotor is excited by potential represented $E \sin wt$. Thus, at each of the output lines 6, 7 and 8 of the control transmitter, there appears a potential proportional to $E \sin wt$, but respectively modified by the sine of an angle representing the relative positions of the stator windings and the rotor winding. That is, the line 6, for example, will have a potential $Ek \sin wt \sin \theta$, the line 7 will have a potential $Ek \sin wt \sin (\theta+120°)$ and the line 8 will have a potential $Ek \sin wt \sin (\theta+240°)$.

The potentials on lines 6, 7 and 8 are applied to a Scott T transformer network 9 of the control transformer 1. The Scott T transformer network may be of the type shown in FIGS. 3 and 4 of the aforementioned Naydan et al., Patent No. 3,277,464 or any electrical equivalent thereof. In any event, the network 9 is responsive to the three phase excitation receivable from the servo along lines 6 through 8 to produce two phase signals which are also representative of the position of the shaft 4. These two-phase signals appear on pairs of lines 10–11 and 12–13 in the form $\pm Ek \sin wt \sin \theta$ and $\pm Ek \sin wt \cos \theta$.

The signals so derived on lines 10 through 13 are applied to respective cosine and sine networks 14 and 15 under the control of switches 16, 17, 18 and 19 interposed in these respective lines. These switches are electronic switches even though the symbols representing them does not make this clear. Thus, switches 16 and 17 control the lines 10 and 11 for selective application of signals to the cosine network 14 and switches 18 and 19 control the respective lines 12 and 13 for the selective application of signals to the sine network 15.

Digital command input signals, binary coded and representing an angle in binary digital form, are applied through an input line 20 to a shift register 21 and simultaneously to a polarity logic circuit 22 which is shown in greater detail in FIGURE 2 of the drawings. The circuit 22 is effective to control the actuation of switches 16 through 19, as explained in detail hereinbelow. As fully explained in connection with FIGS. 12 and 13 in the above-mentioned Patent No. 3,277,464, the conditions of the respective stages of the shift register 21 are effective to control switches in the respective cosine and sine networks 14 and 15 to establish resistive circuits which, in response to potentials applied thereto, allow currents to flow therein, proportional to the cosine and sine respectively of the angle digitally introduced on line 20. As a consequence, if a potential such as that represented by the value $Ek \sin wt \sin \theta$ should be applied to cosine $\phi$ network 14 through switch 16, the output of the cosine $\phi$ network 14 would be a potential of the value $Ek \sin wt \sin \theta \cos \phi$ and, similary, a potential of the value $Ek \sin wt \cos \theta$ applied to the sin $\phi$ network 15 under the control of the switch 18 would result in an output potential equal to $Ek \sin wt \cos \theta \sin \phi$.

The action of the polarity logic network 22 is such as to control the switches 16 through 19 so as to render one of each pair 16–17 and 18–19 closed and the other of the pair open in response to each input command. In each case a combination of switches is closed so as to produce output potentials from the sine and cosine networks which are mutually out of phase, consideration being given to the polarity of potentials on lines 10–13 and the polarity of sine and cosine of the command angle. The manner in which these switches are selected and closed under the control of polarity logic circuit 22 may be made clear by reference to FIGURE 2, showing the details of this circuit. In this circuit a two bit register 25 is provided for storing the two highest order bits of the command angle, namely, the 180° and the 90° bits. The outputs of these respective stages are considered logical ones in the cases wherein bits corresponding to these stages are received and logical zeros in cases wherein the corresponding bits are not received. The output of the 180° bit stage of register 25 is applied directly to the control circuit for operation of switch 17 and is also applied directly to the input of an inverter 26 and one leg of an AND circuit 27. The output of the 90° bit stage of this register is applied to the input of inverter 28 to the other leg of AND circuit 27. The output of inverter circuit 26 is applied directly to the control of switch 16 and to one leg of an AND circuit 29 and the output inverter 28 is applied to the other leg of AND circuit 29. The outputs of AND circuits 27 and 29 are applied to the respective inputs of OR circuit 30, the output of which is applied directly to the control of switch 19, and to the input of an inverter 31. The output of inverter 31 supplies the control of switch 18. The positions of the respective switches 16–19 are indicated in the accompanying Table I wherein the logical symbol 1 designates a switch closure and the symbol 0 represents an open switch.

An quadrant of a sine or cosine wave can be represented by the combination of presence or absence of a one bit indicating a 180° or 90°. From an examination of Table I and FIG. 1 of the drawings, it may be observed that switches 16–19 are actuated to apply potentials to the respective cosine and sine networks so that when the potentials from the network 9 are combined with the polarities of the respective sine and cosine values of the command angle, these cosine and sine networks produce potentials of respective opposite polarities.

TABLE I

| Quadrant | Quadrant Bits of Digital Command | | Switch Positions, switch— | | | |
|---|---|---|---|---|---|---|
| | 180° Bit | 90° Bit | 16 | 17 | 18 | 19 |
| 1 — 50°–90°. | 0 | 0 | 1 | 0 | 0 | 1 |
| 2 — 590°–180°. | 0 | 1 | 1 | 0 | 1 | 0 |
| 3 — 5180°–270°. | 1 | 0 | 0 | 1 | 1 | 0 |
| 4 — 5270°–360°. | 1 | 1 | 0 | 1 | 0 | 1 |

Thus, it is seen that in the first quadrant of the polarity of both sine and cosine values is the same and switches 16 and 19 are closed, applying potentials of opposite polarity to the cosine and sine networks. This results in potentials of opposite polarity produced by the respective cosine and sine networks. As another example, in the second quadrant wherein the polarities of cosine and sine are opposite, switches 16 and 18 are closed applying potentials of the same polarity to respective cosine and sine networks. In this case, by reason of the opposite polarity of sine and cosine in the second quadrant, potentials of opposite polarity are produced by the respective cosine and sine networks.

Since the cosine and sine networks 14 and 15 superimpose the digital command signal on the potentials applied thereto from the network 9, the outputs of these networks are represented by the expressions, $Ek \sin wt \sin \theta \cos \phi$ and $-Ek \sin wt \cos \theta \sin \phi$. These potentials are applied to the respective inputs of a summing or combining amplifier 32. Summing amplifier 32 combines these potentials to produce an analog signal which is in the form of a trigonometric function of the difference between the angles $\theta$ and $\phi$. Thus, signal $Ek \sin wt \sin (\theta-\phi)$ is produced and applied to the servo amplifier 33 of the servo system to appropriately drive the motor 3 and reposition the shaft $\theta$ so as to reduce the difference between the angles $\theta$ and $\phi$ to zero.

From the foregoing, it is seen that the control transformer 1 is effective and responsive to the signals from the control transmitter to produce an analog correction signal to the servo system by the use of solid state elements, passive circuit elements and in no case the use of elements having components movable with respect to each other.

The particular form of implementation of circuitry required to carry out the present invention is dependent upon the form of the digital command input to the circuit. In the above-described embodiment of invention, the digital command input was in the form of the command angle itself. However, the input command may be in the form of a pair of signals representing respectively the sine and cosine of the command angle, or may be in the form of the tangent or cotangent of the command angle together with information indicating the particular octant in which the angle is located. In FIGURE 3 of the drawings is shown another embodiment of the invention which is effective in response to digital command input in the form of tangent of the command angle. In this embodiment of invention, the servo system 2' applies a three-phase signal to the Scott T network 9' in a manner entirely similar to that disclosed hereinabove with respect to the embodiment of invention shown in FIGURE 1. The Scott T network 9' also produces two-phase output signals on respective output lines 10', 11', 12' and 13' and interposed in these respective lines for selective control are swtiches 16', 17', 18' and 19'.

The potentials on one line of each pair of lines 10'–11' and 12'–13' are selectively applied to a linear network 33 under the control of additional switches 34 and 35 which are interposed between the input of network 33 and the respective pairs of switches 16'–17' and 18'–19'. Additional switches 36 and 37 are interposed, respectively, between the line pairs 16'–17' and 18'–19' and one input to a summing amplifier 32'. The output of linear network 33 is applied to the other input of summing amplifier 32'.

The linear network 33 is of a type generally known and may take the form shown in either of FIGURES 4 or 5 of the drawings and is responsive to digital control signals, binary coded, to represent the tangent of an input command angle, to produce a resistive network which allows a current proportional to the tangent of the command angle to flow through it in response to an applied potential. In FIGURE 4, the network 33 includes a resistor 38 grounded at one end and serially connected with nine other resistors 39, 40 and others terminating at an output terminal 41. Ten branches circuits, including respective resistors as shown at 42, 43, 44, etc. and respective series switches as shown at 45, 46 and 47 are connected between respective ends of the resistors 39, 40, etc. and ground. Additional switches such as 48, 49, 50 are connected between the input terminal and the junctions of the resistors and switches in each of the branches. The values of each of resistors 38, 42, 43, 44, etc. are twice as great as the values of each of the series connected resistors 39, 40, etc., which are equal to each other.

The alternative linear network shown in FIGURE 5 of the drawings includes ten parallel branches, each having series connected resistors. The first two branches include three resistors each, as shown at 51 through 56 and the remaining branches include two resistors each as shown, for example, at 57–58 and 59–60. The junctions between all resistors of this network are selectively connectable to ground through switches connected between these junctions and ground and shown, for example, at 61 through 66. The resistors in each branch are equal and the values of those in the second branch are double the values of those in the first branch. The value of resistance of the remaining resistors of this network are each equal to 4½ times the value of those in the first branch.

Referring again to FIGURE 3, the switches in these networks are actuable under control of an input register 67 which receives and stores digital command signals from the input line 20'. In a manner similar to that described in connection with register 21 of FIG. 1, the respective stages of register 67 condition the switches of linear network 33 to establish a composite resistance which allows a current to pass therethrough which is proportional to the input command signal which, in turn, is equal to the tangent of the command angle.

According to a feature of this embodiment, the several switches 16'–19' and 34–37 are selectively actuated under the control of an octant switch selector circuit 68 to apply one of the potentials from Scott T network 9' to linear network 33. The selector 68 is effective by control of such switches to select that potential from the Scott T which is out of phase with the input command signal during the eight different octants of the input signal. The manner in which this is accomplished is made clear by reference to FIGURE 6 of the drawings and Table II hereinbelow.

In the circuit of FIGURE 3, the digital command input signals are in the form of tangent of the command angle and accompanying such input command signals is information indicative of the octant of the command angle in the form of bits representing 180°, 90° and 45°, respectively. Thus, these three bits have eight different possible combinations which are indicative of the eight different octants and are derivable from the source presenting the tangent information. Such octant information may, for example, be obtained by the comparison of signs and relative magnitudes of sine and cosine values in the respective octants. The sign and relative magnitude for sine and cosine have a unique combination in each octant. The tangent signal is introduced directly into input register 67 and, as shown in FIGURE 6 of the drawings, the octant information is introduced into a shift register 69 having three stages representing the 180°, the 90° and the 45° bits. The outputs of these different stages of shift register 69 are combined in the circuit of FIGURE 6 to produce at the output thereof signals representative of the octant of the input angle $\phi$. The output of the 180° bit stage of register 69 is applied directly to the control of switch 17', to one input of an AND circuit 70 and through inverter 71 to the control of switch 16'. Thus, the signals at these respective terminals are 180° and $\overline{180}°$, wherein the bar above the quantity indicates its inverse. The output of the 90° bit stage is applied to the input of an inverter 72, to one input of an AND circuit 73 and as one input of an AND circuit 74. The second input to AND circuit 73 is connected to the output of inverter 70. The outputs of AND circuits 70 and 73 are applied to the respective input legs of an OR circuit 75. The output of this circuit is applied to the control of switch 18' and to an inverter 76 to the control of switch 19'. The signals appearing at these respective terminals are $180° \cdot \overline{90}° + \overline{180}° \cdot 90°$ and $180° \cdot 90° + \overline{180}° \cdot \overline{90}°$, wherein the dot ($\cdot$) indicates a logical AND function and the plus ($+$) indicates a logical OR function. The output of the 45° stage of register 69 is applied to the input of an inverter 77 and to one input of AND circuit 74. The output of inverter 77 is applied to one input of an AND circuit 78, the other input of which is connected to the output of the inverter 72. The outputs of AND circuits 74 and 78 are applied to the respective inputs of an OR circuit 79, the output of which is applied to the control of switches 35 and 36 and to an inverter 80, the output of which is applied to the control of switches 34 and 38. The signals appearing at these latter two output terminals are $\overline{45}° \cdot \overline{90}° + 45 \cdot 90°$ and $45° \cdot \overline{90}° + \overline{45}° \cdot 90°$.

TABLE II

| Octant | Octant Bits 180° | 90° | 45° | Input | Switch Positions, Switch— 16' | 17' | 18' | 19' | 36 | 37 | 35 | 34 | Control Transformer Output $\epsilon$ |
|---|---|---|---|---|---|---|---|---|---|---|---|---|---|
| 1 (0°–45°) | 0 | 0 | 0 | Tan $\varphi$ | 1 | 0 | 0 | 1 | 1 | 0 | 1 | 0 | $\epsilon = Ek \sin wt . \dfrac{\sin(\theta-\varphi)}{\cos \varphi}$ |
| 2 (45°–90°) | 0 | 0 | 1 | Cot $\varphi$ | 1 | 0 | 0 | 1 | 0 | 1 | 0 | 1 | $\epsilon = Ek \sin wt . \dfrac{\sin(\theta-\varphi)}{\sin \varphi}$ |
| 3 (90°–135°) | 0 | 1 | 0 | Cot $\varphi$ | 1 | 0 | 1 | 0 | 0 | 1 | 0 | 1 | $\epsilon = Ek \sin wt . \dfrac{\sin(\theta-\varphi)}{-\sin \varphi}$ |
| 4 (135°–180°) | 0 | 1 | 1 | Tan $\varphi$ | 1 | 0 | 1 | 0 | 1 | 0 | 1 | 0 | $\epsilon = Ek \sin wt . \dfrac{\sin(\theta-\varphi)}{-\cos \varphi}$ |
| 5 (180°–225°) | 1 | 0 | 0 | Tan $\varphi$ | 0 | 1 | 1 | 0 | 1 | 0 | 1 | 0 | $\epsilon = Ek \sin wt . \dfrac{\sin(\theta-\varphi)}{-\cos \varphi}$ |
| 6 (225°–270°) | 1 | 0 | 1 | Cot $\varphi$ | 0 | 1 | 1 | 0 | 0 | 1 | 0 | 1 | $\epsilon = Ek \sin wt . \dfrac{\sin(\theta-\varphi)}{-\sin \varphi}$ |
| 7 (270°–315°) | 1 | 1 | 0 | Cot $\varphi$ | 0 | 1 | 0 | 1 | 0 | 1 | 0 | 1 | $\epsilon = Ek \sin wt . \dfrac{\sin \theta-\varphi}{\sin \varphi}$ |
| 8 (315°–360°) | 1 | 1 | 1 | Tan $\varphi$ | 0 | 1 | 0 | 1 | 1 | 0 | 1 | 0 | $\epsilon = Ek \sin wt . \dfrac{\sin(\theta-\varphi)}{\cos \varphi}$ |

From Table II it is seen that the switches 16'–37 are actuated in the respective octants of the input angle so as to provide output signals from the linear network 33 which are a trigonometric function of the difference between the servo rotor position represented by the angle $\theta$ and the angle $\phi$ representing the command. In this table, the numeral 1 represents a switch closure and the numeral 0 represents an open switch. From Table II it is observed that the control transformer output is different from the difference or error signal produced in the circuit of FIG. 1 by the cosine or sine $\phi$ term in the denominator. These latter terms introduce a variation between 1. and 1.414 inasmuch as the cosine or sine between 0 and 45° varies between 1. and .707, and may readily be taken into account. This error signal is applied from the output of summing amplifier 32' to the servo amplifier and motor which is effective to produce a rotation of the shaft and control transmitter rotor to positions wherein the difference between $\theta$ and $\phi$ is reduced to zero.

From the circuits of FIG. 3 and FIG 1 it is observed that in circumstances wherein the digital command input is presented in the form of tangent of the command angle; the circuit is somewhat simplified in the requirements of resistor networks, such as the cosine and sine networks 14 and 15. However, the circuit of FIG. 3 requires the addition of switches 34–37. It is also noted that in addition to the above described embodiments, this invention can be carried out in situations wherein the command angle is presented in the form of the angle itself as in FIG. 1 by the provision of a single network producing currents proportional to tangent of the command angle in response to applied potential. The results, as shown in Table II, would thus be directly applicable if the tangent of $\phi$ network were employed rather than the sin $\phi$ and cos $\phi$ networks.

What is claimed is:
1. A Digital-to-analog system comprising:
   a servo having an analog positional output,
   first network means responsive to said servo for transforming said analog positional information into two-phase analog positional information made available along first and second pairs of output lines respectively,
   switch means for controlling conduction in selected pairs of said output lines respectively, said selected pairs including at least one each from said first and second pairs of output lines respectively,
   second network means for producing analog equivalents to digital command input signals and being coupled to said first network means through said switch means for comparing said analog equivalents to said two-phase analog positional information obtainable from said first network means to produce an analog error signal representing the difference between said analog positional information and said analog equivalents,
   input means responsive to digitally encoded information for activating said switch means to control conduction in said selected pairs of output lines and for supplying digital command input signals to said second network means, and
   means responsive to said error signal for energizing said servo means until said error is nulled.

2. A system according to claim 1, wherein said first network means is adapted to produce output signals along said first and second pairs of output lines in the form $\pm Ek \sin wt \sin \theta$, and $\pm Ek \sin wt \cos \theta$ respectively, where $\theta$ represents said analog positional information, and wherein said second network means is adapted to produce said error signal in the form $Ek \sin wt \sin (\phi-\theta)$ where $\phi$ represents a command input angle, the digitally encoded value of which is supplied to said second network means through input means.

3. A system according to claim 1, wherein said input means includes switch selection means responsive to said digitally encoded information for activating said switch means and register means responsive to said digitally encoded information for supplying said digital command input signals to said second network means.

4. A system according to claim 3 wherein said second network means comprises a linear network and wherein said switch selector means includes a further pair of switches interposed respectively between said linear network and the switch means in said first and second pairs of output lines, said switch selector means including an additional pair of switches interposed respectively between said error signal responsive means and said switch means corresponding to said first and second pairs of output lines, wherein the output of said linear network joins one input to said error signal responsive means and said additional pairs of switches control the interconnection between said first and second pairs of output lines and another input to said error signal responsive means whereby said register means supplies digital command input signals to said linear network proportional to the value of the tangent of an input command angle.

5. A system according to claim 3, wherein said switch selector means is responsive to a pair of different order bits in each word of said digitally encoded information to selectively close the switch in one output line of the first pair in response to the presence of the bit of a first order and to close the switch in one output line of the second pair in response to the presence of bits of both orders or to the absence of bits of both orders, whereby digital input signals having two orders of bits representing 180 degrees and 90 degrees, respectively, of a command angle are effective to close switches to form said selected pairs of said output lines.

6. A system according to claim 4, wherein said switch selector means is responsive to different order bits in each word of said digitally encoded information to selectively close the switch in one output line of the first pair in response to the presence of a bit in a first order of said input signal, to close a switch in an output line of the second pair in response to the presence of the bit in the first order and absence of the bit in a second order or to the absence of a bit in the first order and presence of the bit in said second order, to close one of said further switches and one of said additional switches in response to either presence or absence of bits in said second order and a third order and to close the other of said additional and further switches in response to the presence in one and absence in the other of a bit in the second and third orders of said digital input signal whereby digital input signals having three orders of bits representing 180 degrees, 90 degrees and 45 degrees, respectively, of the angle of a command signal are effective to close predetermined combinations of said switches to apply respectively out of phase potentials to said error signal responsive means in response to two-phase potentials appearing on said pairs of output lines.

References Cited

UNITED STATES PATENTS

| | | | |
|---|---|---|---|
| 3,134,098 | 5/1964 | Herzl | 340—347 |
| 3,277,464 | 10/1966 | Nayden | 340—347 |
| 3,305,858 | 2/1967 | King | 340—347 |
| 3,325,805 | 6/1967 | Dorey | 340—347 |

OTHER REFERENCES

Kakuda: 8560.G.3 filed Aug. 13, 1965, Now Defensive Publication 479,433.

MAYNARD R. WILBUR, Primary Examiner

JEREMIAH GLASSMAN, Assistant Examiner

U.S. Cl. X.R.

235—150.11